United States Patent [19]

Tether

[11] Patent Number: 5,851,162
[45] Date of Patent: Dec. 22, 1998

[54] SYSTEM AND APPARATUS FOR A MULTIPLE INPUT AND DUAL OUTPUT ELECTRIC DIFFERENTIAL MOTOR TRANSMISSION DEVICE

[76] Inventor: David Tether, P.O. Box 314, Benedict, Md. 20612

[21] Appl. No.: 751,982

[22] Filed: Nov. 19, 1996

[51] Int. Cl.⁶ ................................................ F16H 48/30
[52] U.S. Cl. ......................... 475/150; 475/154; 475/330
[58] Field of Search .................................. 475/150–151, 475/154, 149, 329, 330, 346, 12; 74/665 R, 665 L, 665 N

[56] References Cited

U.S. PATENT DOCUMENTS

| | | | |
|---|---|---|---|
| 3,055,448 | 9/1962 | Fagel | 475/149 X |
| 3,770,074 | 11/1973 | Sherman | 475/149 X |
| 3,812,928 | 5/1974 | Rockwell et al. | 475/149 X |
| 4,733,737 | 3/1988 | Falamak | 74/665 N X |
| 4,811,627 | 3/1989 | Mouille | 74/665 L X |
| 5,067,932 | 11/1991 | Edwards . | |
| 5,120,282 | 6/1992 | Fjallstrom | 475/151 X |
| 5,156,579 | 10/1992 | Wakuta et al. | 475/149 X |
| 5,364,319 | 11/1994 | Boll et al. | 475/150 X |
| 5,396,968 | 3/1995 | Hasebe et al. | 475/150 X |
| 5,575,730 | 11/1996 | Edwards et al. . | |
| 5,637,048 | 6/1997 | Maeda et al. | 475/150 |

*Primary Examiner*—Dirk Wright
*Assistant Examiner*—Peter T. Kwon
*Attorney, Agent, or Firm*—Hazel & Thomas, PC

[57] ABSTRACT

A multiple input, dual output differential motor transmission device incorporates a sun gear device having first and second sun gears fixedly connected to each other whereby the first and second sun gears rotate together along a common axis of rotation; first and second ring gear devices having first and second ring gears, respectively; and first and second sets of planetary gears. The first set is inter-engaged between the first sun and ring gears, while the second set is inter-engaged between the second sun and ring gears. The first sun and ring gears are concentrically and independently rotatable relative to each other with the first set of planetary gears inter-engaged therebetween. The second sun and ring gears are concentrically and independently rotatable relative to each other with the second set of planetary gears inter-engaged therebetween. Rotation of at least one of the first and second sun gears together, the first ring gear and the second ring gear generates at least one of rotational and revolving movement of a corresponding one of the first and second sets of planetary gears.

14 Claims, 12 Drawing Sheets

SYSTEM AND APPARATUS FOR A MULTIPLE INPUT AND DUAL OUTPUT ELECTRIC DIFFERENTIAL MOTOR TRANSMISSION DEVICE

BACKGROUND OF THE INVENTION

1. Field of the Invention

The present invention relates generally to a system for propelling various types of vehicles that incorporate or require multiple output propulsion devices. In particular, the invention relates to a motor transmission system for an electric vehicle that uses a plurality of combined electric motor and transmission devices with a continuously variable speed output and a stored energy supply for powering the device.

2. Description of the Prior Art

Currently, all land vehicles rely on the use of internal combustion engines as their primary source of motive energy. However, internal combustion engines require constant maintenance and often become environmental hazards after extended use or inadequate maintenance. For example, internal combustion engines require the use of oil-based fuels and lubricants that can leak and emit unpleasant, unsightly and unsafe by-products. In addition, internal combustion engines are comparatively loud, and often can become unreliable due to age, constant or strenuous use, or constant exposure to extreme environmental conditions (e.g., the weather) common to the environment of most other land vehicles. The necessary fuel system and engine block are bulky and add unwanted weight to vehicles. Finally, the supply of fuels and lubricants carried on a vehicle is limited, and can also pose a fire hazard to the vehicle and its occupants.

On the other hand, electric motors are generally quieter, less polluting and require less maintenance than internal combustion engines. However, electric motors also suffer from a number of inherent problems. When electric motors are applied to land vehicles (i.e., electric-powered automobiles), several motors are typically required in order to provide motive power to each wheel in the vehicle. With a conventional configuration for an automobile with four wheels, four electric motors along with four motor controllers, one for each of the electric motors, are required. In order for an electric vehicle to be able to perform all the various functions of a conventional automobile as currently designed (e.g., accelerate, decelerate, maintain or increase speed on inclines, maintain control on slippery roads, perform sharp turns on acceleration or deceleration), a central control system that would link the operator's steering, accelerator and braking controls with each electric motor's controller would be required. In addition, if an effort is made to centralize all electronic or computer-controlled functions in the automobile (i.e., radio, HVAC, instrumentation, navigation aids), the central control system would then become very complex.

Further, if instead of individual electric motors, the electric automobile is implemented using electric motor transmission devices such as those disclosed in U.S. Pat. No. 5,067,932 to Edwards, then the control circuits for just the individual electric motor transmission devices would automatically be very complex because, as disclosed in the '932 patent, an electric motor transmission device consists of at least an outer ring gear motor and an inner sun gear motor, wherein each motor may be independently controllable. A central control system or circuit for linking the control circuits of several electric motor transmission devices to the operator's steering, accelerator and braking controls would be far more complex than the control circuit for an electric automobile using conventional electric motors. Also, by using electric motor transmission devices in an electric automobile, one automatically adopts the higher cost of using a more complex device such as the electric motor transmission device and its control circuit.

Though use of electric motor transmission devices in an electric automobile has the advantages of being comparatively lightweight and highly energy efficient due to a low number of mechanical parts, low energy losses and the use of regenerative braking, any effort to minimize the cost of using the electric motor transmission device and its control circuitry while retaining all the advantages gained from their use would be highly desirable.

A need exists, therefore, for a propulsion system for land vehicles based on the electric motor transmission device that is comparatively lightweight and dependable, occupies less space than conventional internal combustion engines, and can operate for extended periods of time. At the same time, such a system must minimize the cost and complexity of adopting an electric motor transmission device-type structure, while retaining all the advantages gained by the use of that device.

SUMMARY OF THE INVENTION

In view of the disadvantages and shortcomings present in the prior art, a general object of the present invention is to provide a system and apparatus for a multiple input and dual output electric differential motor transmission device.

A further general object is to provide a system and apparatus for an electric differential motor transmission system for a land vehicle.

Another general object of the invention is to provide an apparatus and method for an electric differential motor transmission system for a land vehicle that is comparatively lightweight and efficient.

A further general object of the invention is to provide an apparatus and method for an electric differential motor transmission system for a land vehicle that requires less room, or is at least more space efficient, than conventional auxiliary propulsion systems.

An even further object is to provide an apparatus and method for an electric differential motor transmission system for a land vehicle that minimizes the cost and complexity of using electric motor transmission devices and their control circuits, while retaining all the advantages gained by the use of such devices.

According to one aspect of the invention, the apparatus of the multiple input, dual output differential motor transmission device incorporates a sun gear device having first and second sun gears fixedly connected to each other whereby the first and second sun gears rotate together along a common axis of rotation; first and second ring gear devices having first and second ring gears, respectively; and first and second sets of planetary gears. The first set is inter-engaged between the first sun and ring gears, while the second set is inter-engaged between the second sun and ring gears. The first sun and ring gears are concentrically and independently rotatable relative to each other with the first set of planetary gears inter-engaged therebetween. The second sun and ring gears are concentrically and independently rotatable relative to each other with the second set of planetary gears inter-engaged therebetween. Rotation of at least one of the first and second sun gears together, the first ring gear and the second ring gear generates at least one of rotational and revolving movement of a corresponding one of the first and second sets of planetary gears.

According to a more specific aspect of the invention, the multiple input, dual output differential motor transmission system incorporates a sun gear device; a first ring gear device having a first ring gear and a first ring drive means for rotatively driving the first ring gear; a second ring gear device having a second ring gear and a second ring drive means for rotatively driving the second ring gear; a first plurality of planetary pinion gears, including a first mounting element on which each of the first plurality of pinion gears is rotatably mounted; a second plurality of planetary pinion gears, including a second mounting element on which each of the second plurality of pinion gears is rotatably mounted; and control means. The sun gear device includes first and second sun gears, means for fixedly connecting the first and second sun gears to each other along a common axis of rotation, and sun drive means for rotatively driving the first and second sun gears together. The control means controls each of the sun drive means, the first ring drive means and the second ring drive means independent of each other, whereby operation of at least one of the sun drive means, the first ring drive means and the second ring drive means at least one of revolvingly drives the first and second pluralities of planetary pinion gears and rotationally drives each of pinion gear in the first and second pluralities of pinion gears. Each of the first plurality of pinion gears is inter-engaged between the first sun gear and the first ring gear, with the first sun and ring gears being concentrically and independently rotatable relative to each other. Each of the second plurality of pinion gears is inter-engaged between the second sun gear and the second ring gear, with the second sun and ring gears being concentrically and independently rotatable relative to each other.

Other objects and features of the present invention will be apparent from the following detailed description of the preferred embodiments.

BRIEF DESCRIPTION OF THE DRAWINGS

The invention will be further described in conjunction with the accompanying drawings, in which:

FIGS. 6A and 6B show partial detailed drawings of the rotors and stators in the outer ring gear motor according to the second embodiment of the present invention, wherein FIG. 6A is a view along 6A—6A in FIG. 5 and FIG. 6B is a view along 6B—6B in FIG. 5;

FIGS. 7A–7C show partial detailed drawings of the rotors and stators in the common sun gear device motor according to the first and second embodiments, respectively of the present invention, wherein FIG. 7A is a view along 7A—7A in FIG. 3, FIG. 7B is a view along 7B—7B in FIG. 5, and FIG. 7C is a view along 7C—7C in FIG. 5;

DETAILED DESCRIPTION OF THE PREFERRED EMBODIMENTS

Figure 1:
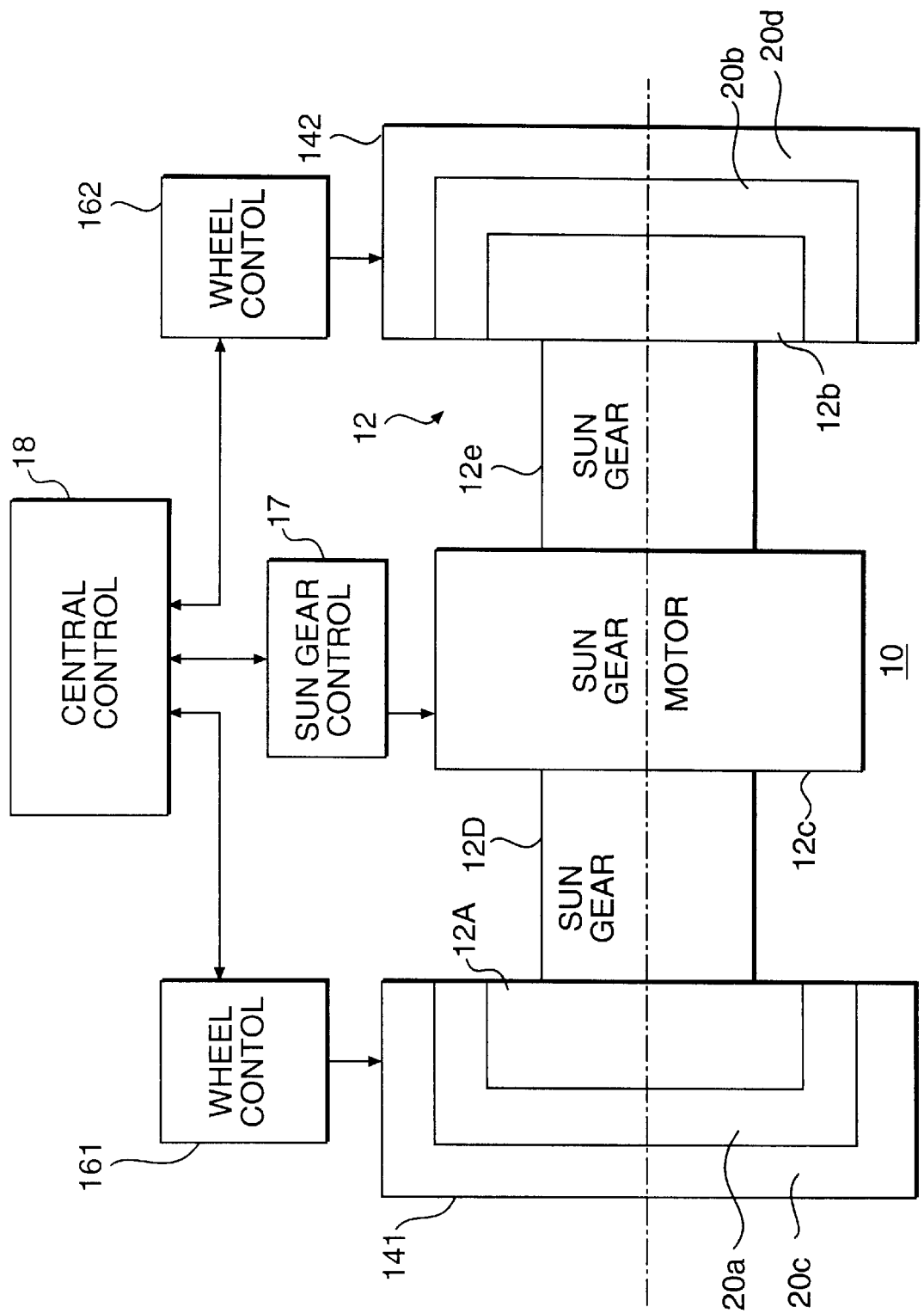
FIG. 1 illustrates a system block diagram of an electric motor transmission device-based propulsion system according to a general embodiment of the present invention.

With reference to the figures, like reference characters will be used to indicate like elements throughout the several embodiments and views thereof. In particular, with reference to FIG. 1, the electric differential motor transmission system 10 of the present invention is generally embodied in a pair variable speed electric motor/transmission devices 141, 142 connected together through a common sun gear device 12. The motor/transmission devices 141, 142 are based on the dual-input, infinite-speed electrically powered motor/transmission device as disclosed in U.S. Pat. No. 5,067,932, which is incorporated herein by reference.

As explained in U.S. Pat. No. 5,067,932, an electric motor/transmission device, as applicable to the present invention, includes a sun gear motor powering a sun gear assembly, a ring gear motor powering a ring gear assembly and a transmission assembly. The ring gear assembly can be rotated in a forward or reverse direction at an infinite number of speeds. To alter the amount of torque delivered by the motor/transmission device, the sun gear assembly may be rotated in a forward direction or a reverse direction, or may be locked in a stationary position. In a land vehicle that incorporates four motor transmission devices, one for each motor transmission device, four separate control circuits are also included, one for each device.

In the electric differential motor transmission system of the present invention, the common sun gear device 12 includes sun gears 12a, 12b that inter-engage with the motor transmission devices 141, 142, respectively, and a sun gear motor 12c. The sun gear motor 12c is operatively connected to each of the sun gears 12a, 12b whereby the sun gears will commonly rotate when the motor 12c is activated. For example, the sun gears 12a, 12b may be connected via connector elements 12d, 12e, respectively, to the rotor (not shown) of the sun gear motor 12c. In at least one embodiment, the connector elements 12d, 12e are formed as shafts each fixedly connecting a corresponding sun gear 12a or 12b with the sun gear motor 12c (e.g., the rotor of the sun gear motor).

The motor transmission device 141 includes an outer ring gear 20a and an outer ring gear motor 20c, while the motor transmission device 142 incorporates an outer ring 20b and an outer ring gear motor 20d. Each of the motor/transmission devices 141, 142 also includes a wheel control circuit 161, 162, respectively, with a central control circuit 18 that communicates with the wheel control circuits 161, 162. In addition, a sun gear control circuit 17, also connected to the central control circuit 18, is provided for controlling the sun gear motor 12c. The central control circuit 18 controls the operation of each of the wheel control circuits 161, 162 and the sun gear control circuit 17, and thereby controls the operation of the motor/transmission devices 141, 142.

Figure 2:
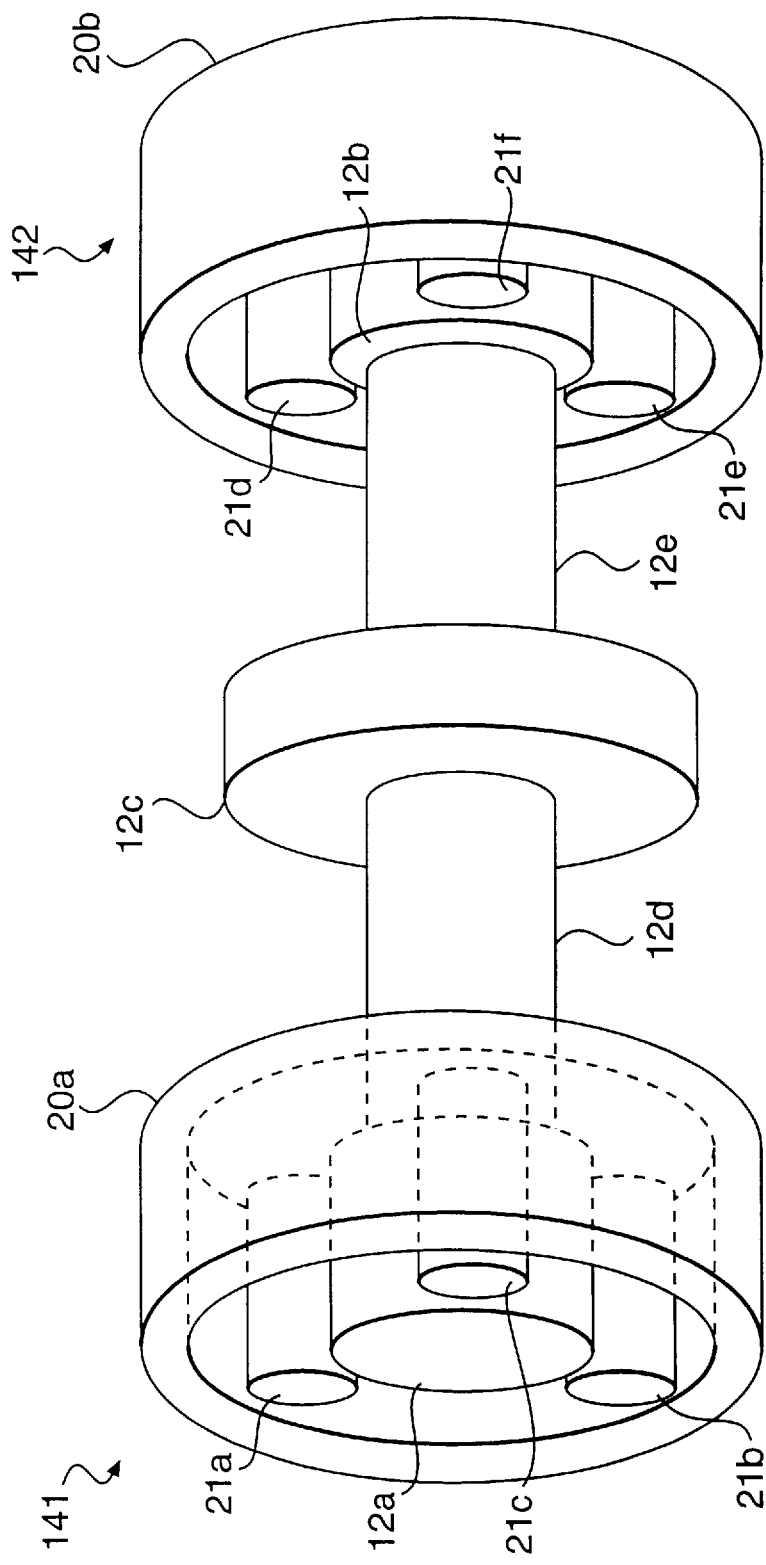
FIG. 2 shows a perspective view of a generalized illustration of the multiple input and dual output electric differential motor transmission device according to the present invention.

As illustrated in FIG. 2, each of the motor transmission devices 141, 142 includes three pinion or planetary gears inter-engaged between the outer ring gears and the sun gears. Specifically, pinion or planetary gears 21a–21c are inter-engaged between the outer ring gear 20a and the sun gear 12a. Planetary gears 21d–21f are inter-engaged between the outer ring gear 20b and the sun gear 12b. Gear teeth (not shown) formed on the inner peripheral surface of the outer ring gears 20a, 20b rotatingly engage with gear teeth (not shown) formed on the outer peripheral surface of their corresponding planetary gears 21a–21c, 21d–21f. Similarly, gear teeth (not shown) on the outer peripheral surface of the sun gears 12a, 12b rotatingly engage with the gear teeth of their corresponding planetary gears 21a–21c, 21d–21f. The sun gears 12a, 12b are fixedly connected via connector elements 12d, 12e (in this case, shafts) to the sun gear motor 12c. In general, activation (i.e., rotation) of either or both the outer ring gear motors 20c, 20d and the sun gear motor 12c will movably rotate the planetary gears 21a–21c, 21d–21f. As will be explained hereinbelow, different combinations of operating the outer ring gear motors 20c, 20d and the sun gear motor 12c will vary the movement and operation of the planetary gears.

Figure 3:
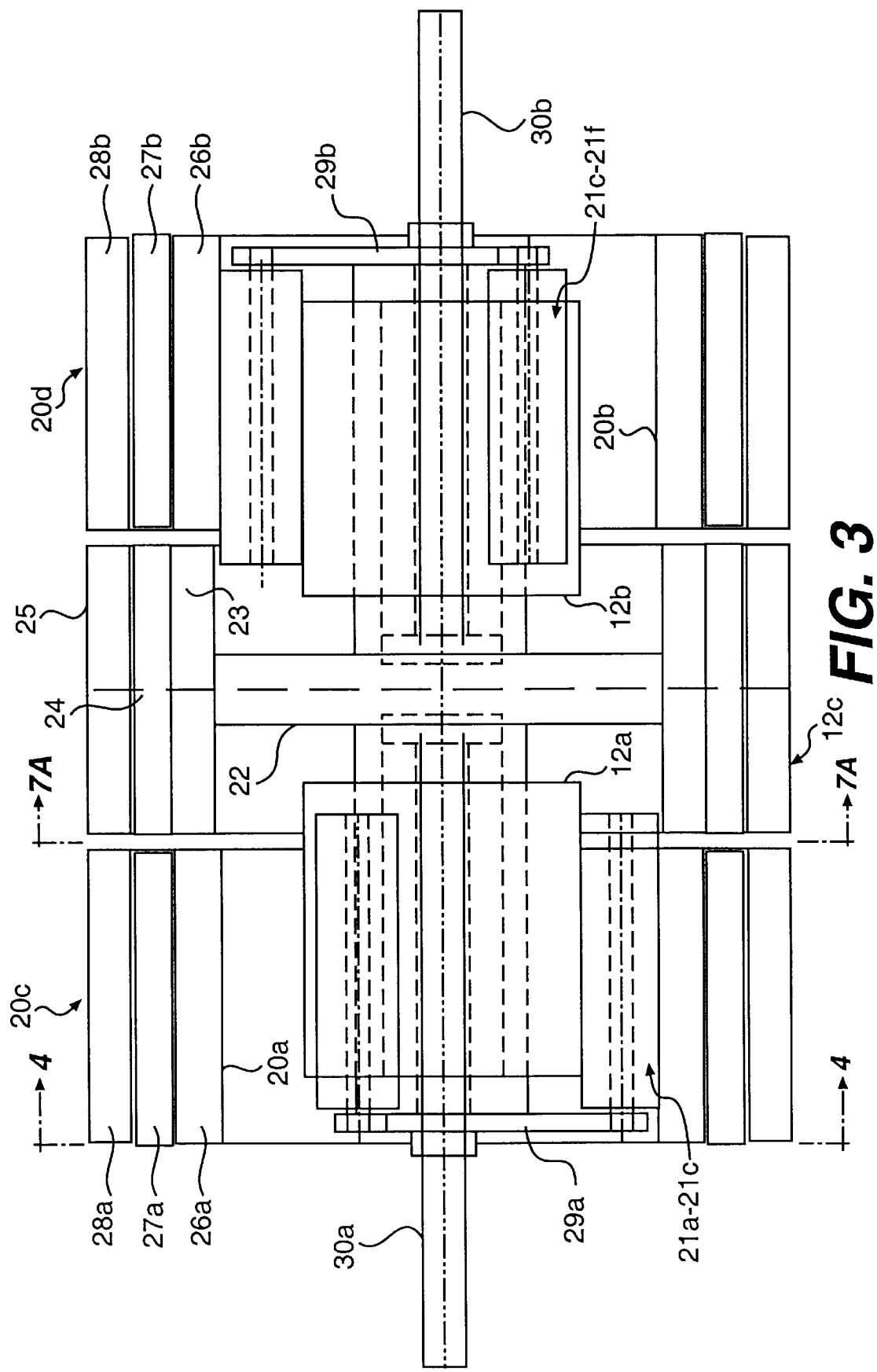
FIG. 3 illustrates a general diagram of an electric differential motor transmission system according to a first embodiment of the present invention.

As shown in FIG. 3, in a first embodiment for implementing the electric motor transmission system, the sun gear motor 12c consists of a circular frame 22 that is concentrically connected with the sun gears 12a, 12b. The rotor 23 of the sun gear motor 12c is located along the outer periphery of the frame 22. The stator 24 of the sun gear motor 12c is then mounted on a cylindrical outer frame 25 surrounding the rotor 23 and circular frame 22.

Figure 7A:
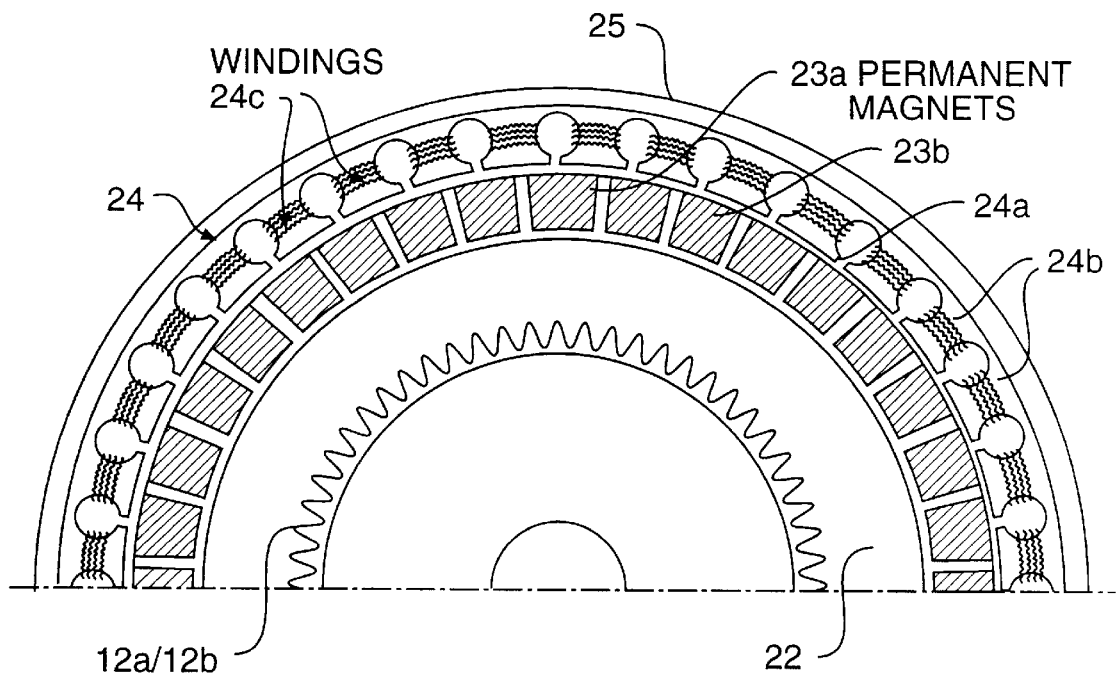

FIG. 7A shows a view of the sun gear motor 12c and the sun gear 12a taken along 7A—7A in FIG. 3 to illustrate the detail features illustrated thereby. The elements associated with the sun gear 12b will be similarly configured. In this first embodiment, the rotor 23 is formed as a plurality of permanent magnets (in this case, 36 permanent magnets) with poles 23a, 23b of opposite polarity alternatingly positioned radially around the outer periphery of the frame 22. The stator 24 is implemented using a plurality of stator teeth 24a (in this case, 36 stator teeth) positioned along the inner peripheral surface of the cylindrical outer frame 25. Each of the stator teeth 24a has a core 24b with a winding 24c.

Figure 4:
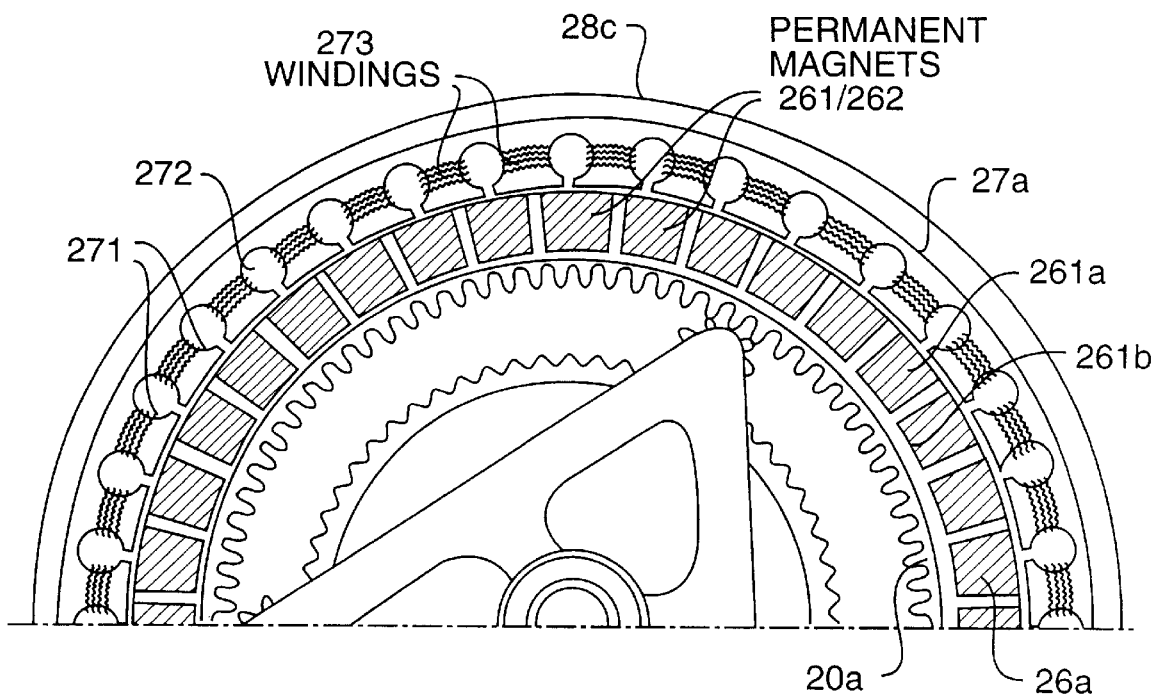
FIG. 4 shows a partial detailed drawing of the rotors and stators in the outer ring gear motor along 4—4 in FIG. 3 according to the first embodiment of the present invention.

FIG. 4 shows a view of the outer ring gear motor 20c and the outer ring gear 20a taken along 4—4 in FIG. 3 to illustrate the detail features illustrated thereby. The elements associated with the ring gear motor 20d and the outer ring gear 20b will be similarly configured. As illustrated, the outer ring gear motors 20c, 20d consist of rotors 26a, 26b radially formed, respectively, on the outer peripheral surfaces of the outer ring gears 20a, 20b. The stators 27a, 27b are mounted on the inner peripheral surfaces of cylindrical outer frames 28a, 28b, respectively, surrounding the rotors 26a, 26b on the outer ring gears 20a, 20b.

In this first embodiment, each of the rotors 26a, 26b is formed as a plurality of permanent magnets 261, 262 (in this case, 36 permanent magnets) positioned on the outer peripheral surfaces of the outer ring gears 20a, 20b. Poles of the permanent magnets 261a, 261b of opposite polarity are alternatingly arranged. The stators 27a, 27b are each implemented using a plurality of stator teeth 271 (in this case, 36 stator teeth) located on the inner peripheral surface of the cylindrical outer frames 28a, 28b relative to the rotor 26a, 26b. Each of the stator teeth 271 is incorporates a stator core 272 with a winding 273.

Figure 6A:
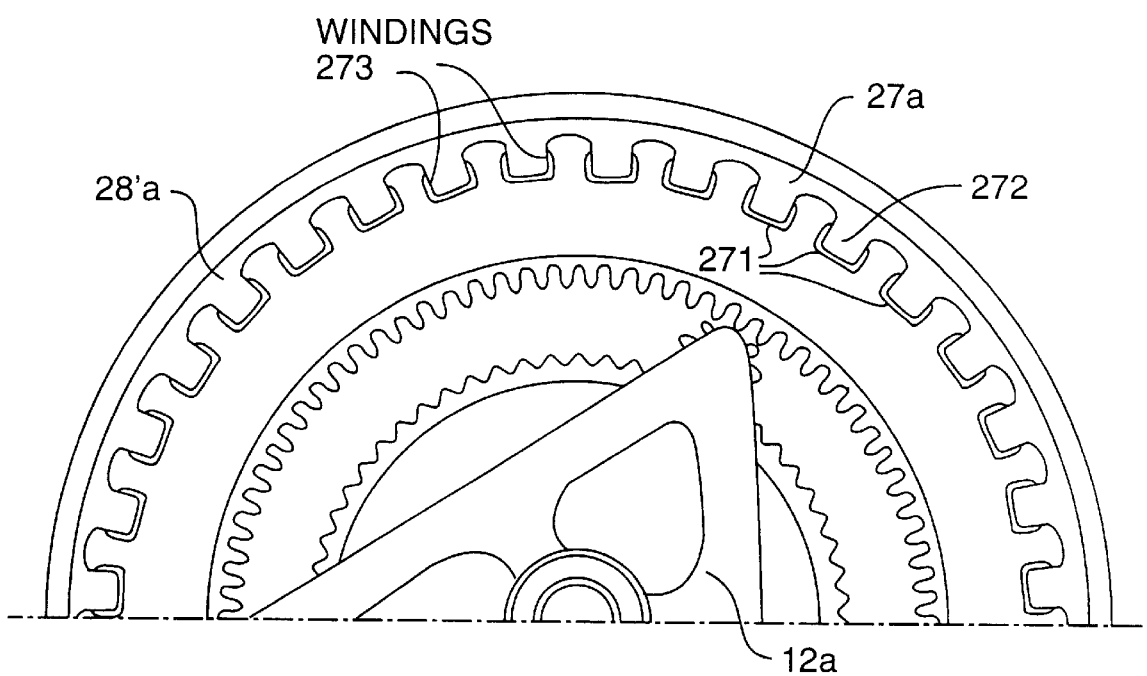
Figure 5:
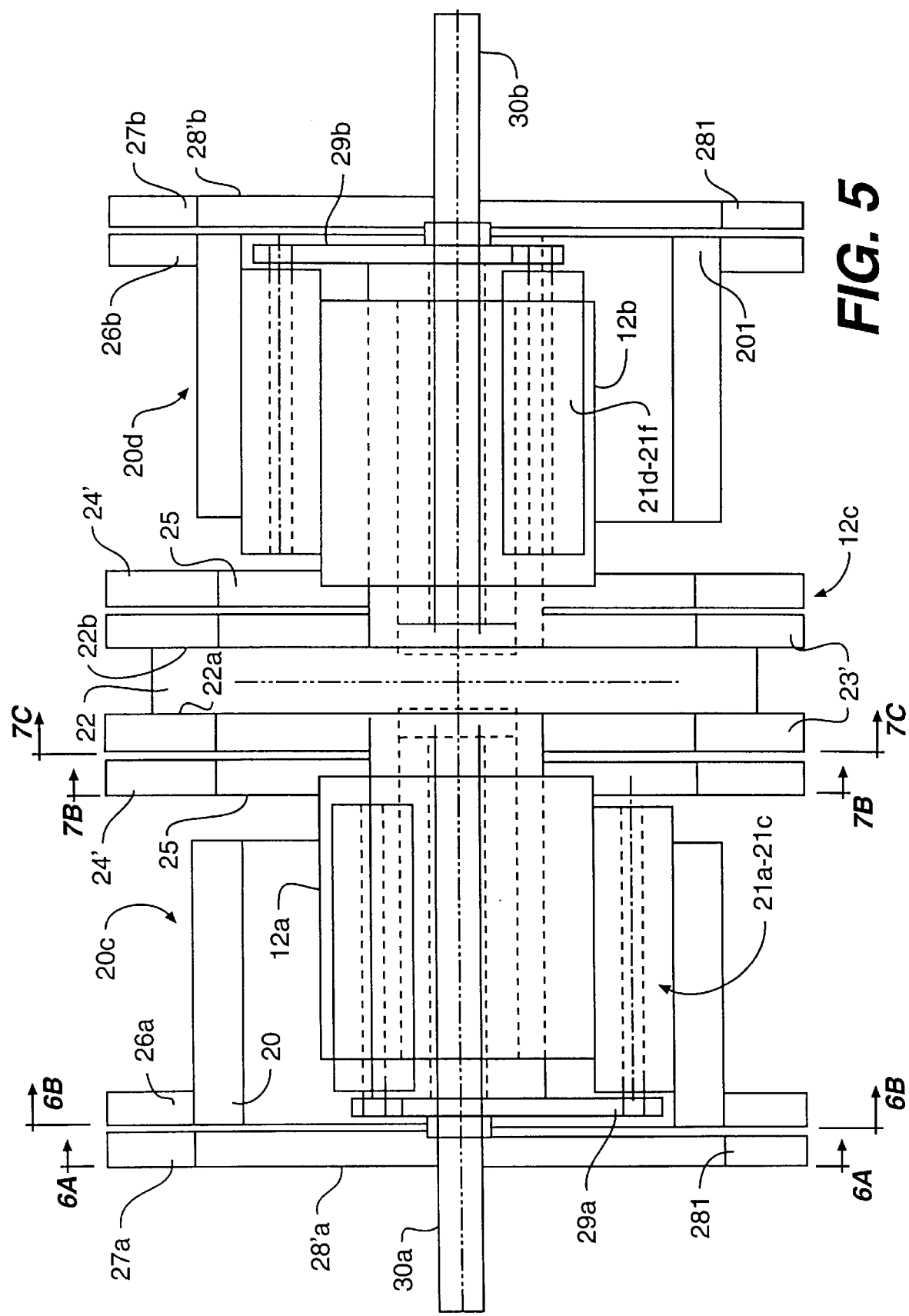
FIG. 5 illustrates a general diagram of an electric differential motor transmission system according to a second embodiment of the present invention.
Figure 6B:
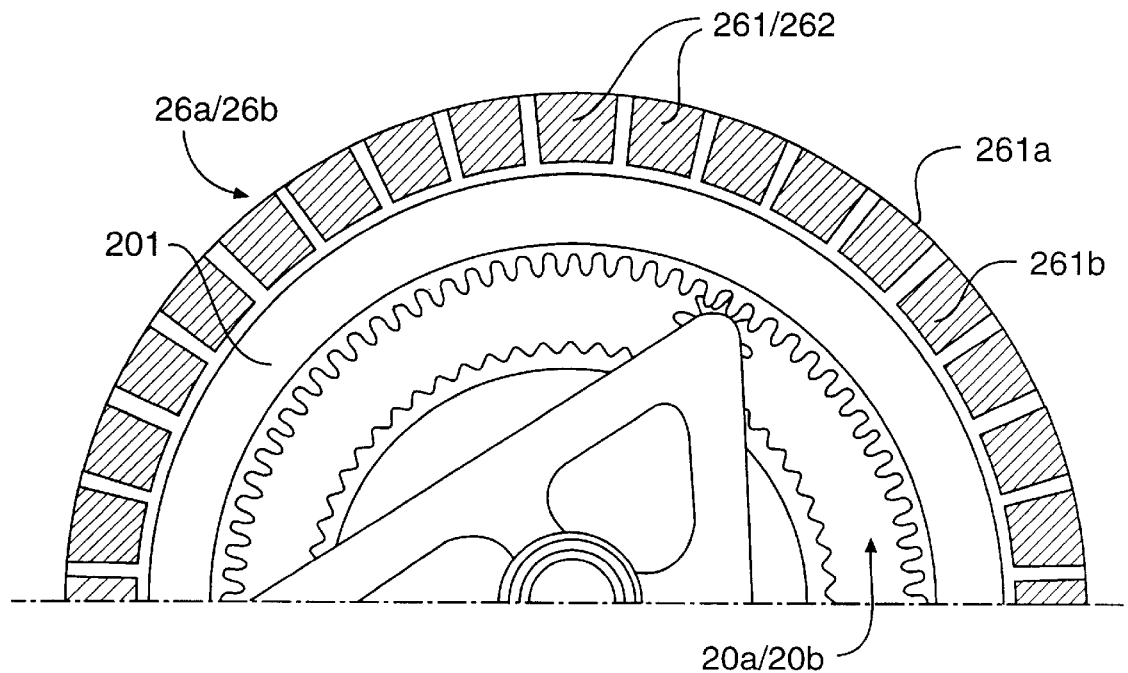

An overall view of a second embodiment of the present invention is shown in FIG. 5. FIG. 6A shows a view of the stator 27a of the outer ring gear motor 20c along 6A—6A in FIG. 5, while FIG. 6B shows a view of the rotor 26a of the outer ring gear motor 20c along 6B—6B in FIG. 5. The equivalent elements associated with the outer ring gear motor 20d will be similarly configured. The the outer ring gear motors 20c, 20d consist of rotors 26a, 26b, respectively, axially formed on the outer peripheries of the outward face 201 of each outer ring gear 20a, 20b. The stators 27a, 27b are axially mounted along the periphery 281 of each of the outer frames 28'a, 28'b, respectively, opposite to the rotors 26a, 26b on the outer ring gears 20a, 20b.

As with the first embodiment, each of the rotors 26a, 26b is formed as a plurality of permanent magnets 261, 262 (in this case, 36 permanent magnets) with poles of the permanent magnets 261a, 261b of opposite polarity being alternatingly arranged. The stators 27a, 27b are also each implemented using a plurality of stator teeth 271 (in this case, 36 stator teeth), each of the stator teeth 271 incorporating a stator core 272 with a winding 273.

Figure 7B:
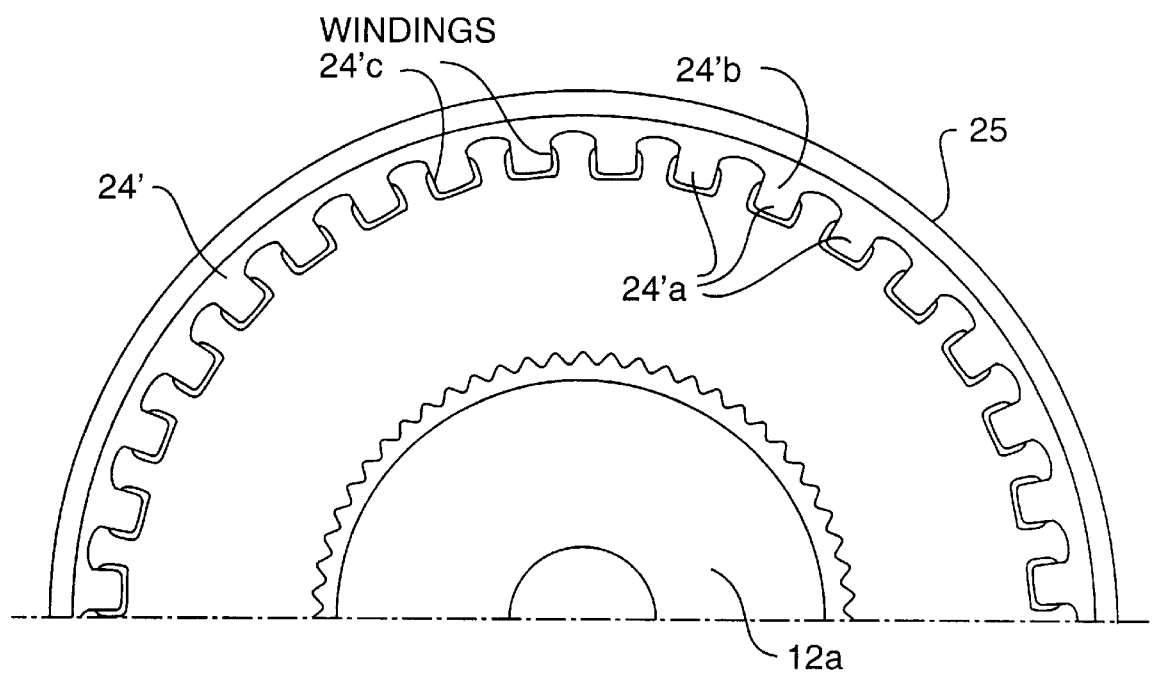
Figure 7C:
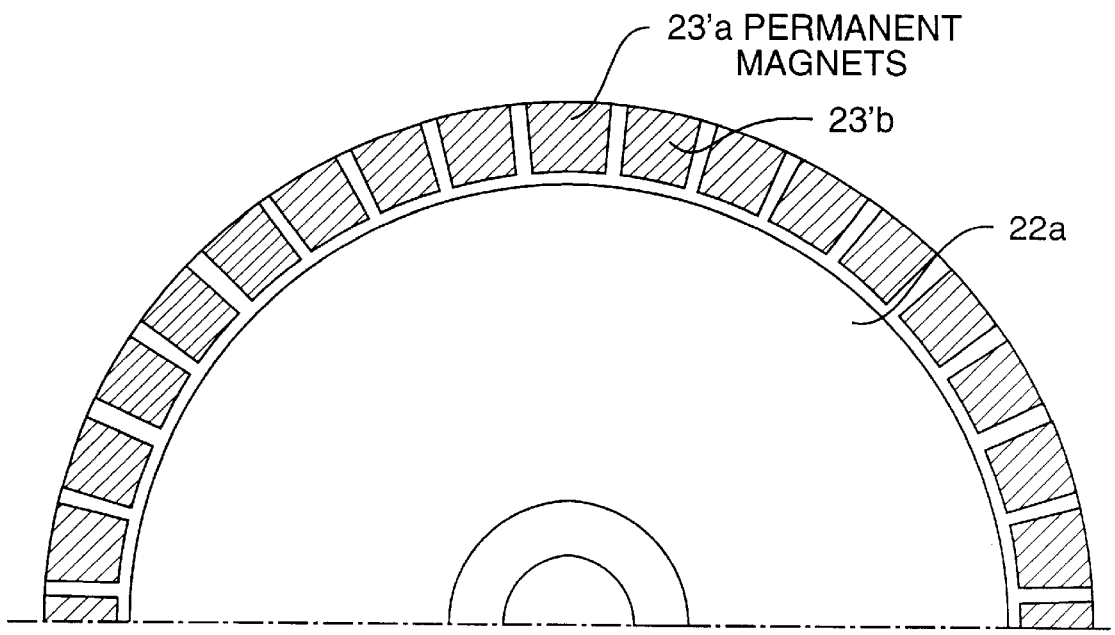

In this second embodiment, the sun gear motor 12c may be formed with the same structure as that used in first embodiment as shown in FIG. 7A. The sun gear motor 12c may also formed with a rotor 23' is formed, as shown in FIGS. 5, 7B and 7C, wherein FIG. 7B shows a view along 7B—7B in FIG. 5 of the stator 24', while FIG. 7C shows a view along 7C—7C in FIG. 5 of the rotor 23'. As illustrated, the sun gear motor 12c is formed with a rotor 23' having a plurality of permanent magnets (in this case, 36 permanent magnets) with poles 23'a, 23'b of opposite polarity alternatingly positioned axially around outer peripheries of both faces 22a, 22b of the frame 22. The stator 24' is implemented using a plurality of stator teeth 24'a (in this case, 36 stator teeth) positioned along the inner peripheral surface of an outer frame 25' on both sides of the rotor 23'. Each of the stator teeth 24'a has a core 24'b with a winding 24'c.

In the above embodiments, the outer ring gear motors 20c, 20d may be implemented using 20 HP AC/DC motors with a gear ratio of 1.6 in each of the outer ring gears 20a, 20b, while the sun gear motor 12c is implemented using a 20 hp to 25 hp AC/DC motor with 2.6 gear ratio on the sun gears 12a, 12b. However, in either of the first or second embodiments for the outer ring gear motors 20c, 20d and sun gear motors 12c, different types and configurations of electric motors and their components may be used as alternatives to those described above as would be known to one of ordinary skill in the art. Further, the materials used for the electric motors and their components, in all of the embodiments, are consistent with those used for conventional applications as would be understood by one of skill in the art.

Figure 8A:
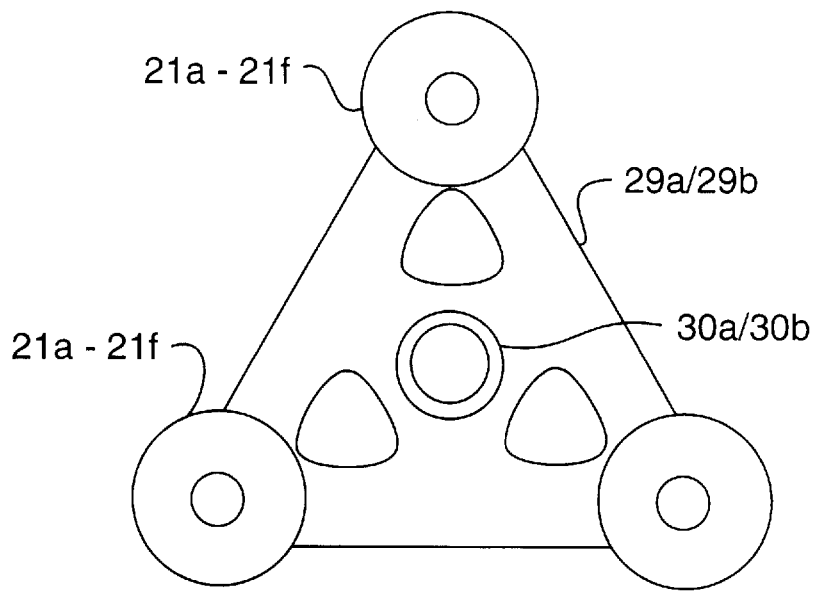
FIGS. 8A and 8B show detailed drawings of the planetary gears and their corresponding output structures according to the general embodiment of the present invention.
Figure 8B:
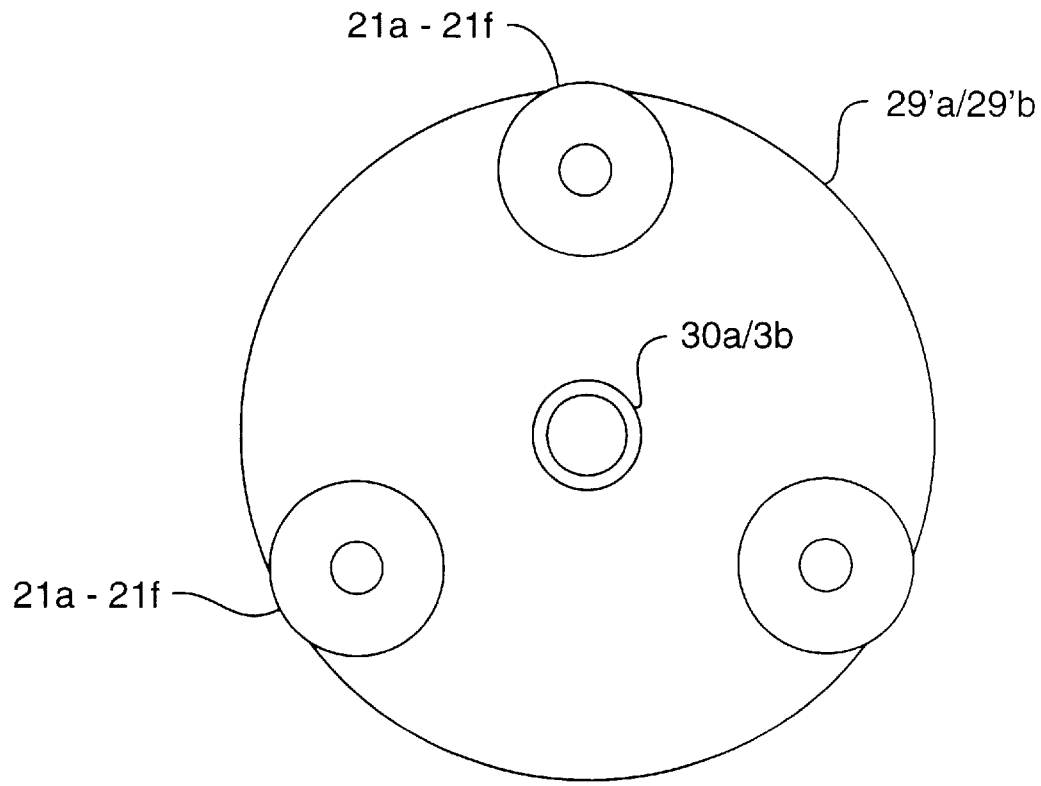

As illustrated in FIGS. 8A and 8B, each group of the planetary gears 21a–21c or 21d–21f, in at least one embodiment, are rotatively connected to a mounting plate or cage 29a or 29b, respectively. In FIG. 8A, the mounting plates or cages 29a, 29b are implemented as equilateral triangular plates with the planetary gears mounted on one side at each corner of the triangle. In FIG. 8B, the mounting plates or cages 29'a, 29'b are formed as circular discs with the planetary gears rotatively mounted on one side near the outer periphery of the discs and 120° apart. In the embodiment illustrated in FIG. 3, the triangular mounting plate or cage is used. In preferred embodiments of the present invention, the planetary gears 21a–21f are formed with gear ratios, and the mounting plates or cages 29a, 29b are formed from materials conforming to the specific applications of the systems and to correspond to the structure and operation of the sun gear motor 12c and the outer ring gear motors 20c, 20d as would be understood by one of skill in the art.

The plates or cages 29a, 29b are each structured to allow free rotation of each planetary gear on their individual axes. When the planetary gears 21a–21c, 21d–21f are positioned between the outer ring gears 20a, 20b and the sun gears 12a, 12b (see FIG. 3), rotation of the outer ring gears and/or the sun gears, as will be discussed further below, will in turn result in the rotational and revolving movement of the planetary gears. Correspondingly, the mounting plates or cages 29a, 29b will rotate relative to their corresponding planetary gears. Rotation of the mounting plates or cages 29a, 29b will then be transmitted through their corresponding output shafts 30a, 30b. The output shafts can then be operatively connected to wheels, propellers, other gears or gear systems, pulleys, etc. whereby the outputs generated by the movement of the planetary gears may be used for locomotion.

FIGS. 9A–9E illustrate the various modes for the operation of the electrical differential motor transmission system. Each figure embodies a simplified representation of the system illustrated in FIG. 2. In particular, the disk SG in the center of each diagram represents the operation of the sun gears 12a, 12b and the sun gear motor 12c. The disks RG1, RG2 on either side of the disk SG represent the operation of the outer ring gears 20a, 20b and their corresponding outer ring gear motors 20c, 20d. The disks PG1, PG2 on the outside of the disks RG1, RG2, respectively, represent the revolving movement of the planetary gears 21a–21c, 21d–21f, respectively, and the resulting operation of the output shafts 30a, 30b.

In each of the drawings, the arrow symbols represent the direction of movement of their corresponding elements. The padlock symbols  indicate that their corresponding element is either stationary or locked in place. The null symbol φ indicates that the corresponding element has a net resulting movement or velocity of 0.

As shown, the operation modes for the system include (1) energizing only the outer ring gear motors 20c, 20d both in the same direction of rotation; (2) energizing only the sun gear motor 12c and, correspondingly, both sun gears 12a, 12b; (3) energizing both the outer ring gear motors 20c, 20d and the sun gear motor 12c all in the same direction of rotation; (4) energizing both the outer ring gear motors 20c, 20d and the sun gear motor 12c with the outer ring gears rotating in a direction opposite the sun gears 12a, 12b; and (5) energizing both the outer ring gear motors 20c, 20d in opposite rotational directions to one another with the sun gear motor 12c either stationary or rotating in the same direction as one of the outer ring gears 20a, 20b.

Figure 9A:
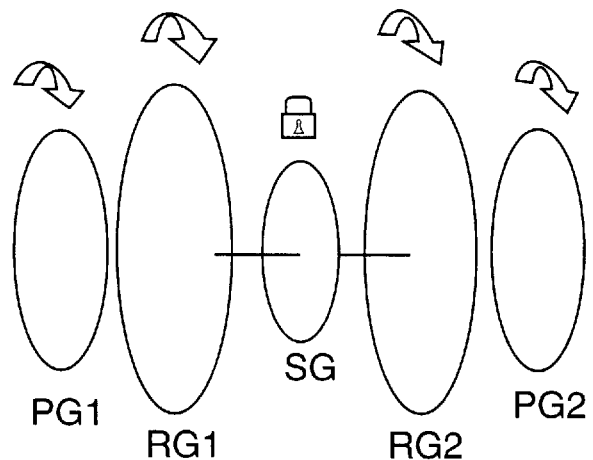
FIGS. 9A–9E show simplified representations of the electric motor transmission device-based propulsion system illustrating the various operating modes of the general embodiment of the present invention.

With mode (1), as illustrated in FIG. 9A, the outer ring gears represented by RG1, RG2 are energized and rotate in the same direction. The disk SG is de-energized or locked stationary. As a result of the rotation of RG1 and RG2, the planetary gears represented by PG1, PG2 rotate and revolve in the same direction, whereby torque and rotational movement in that same direction are outputted. In this mode, the levels of outputted rotational velocity and torque achievable are dependent on the rated performance characteristics of the outer ring gear motors 20c, 20d and the gear ratio of the outer ring gears 20a, 20b relative to the planetary gears 21a–21c, 21d–21f.

Figure 9B:
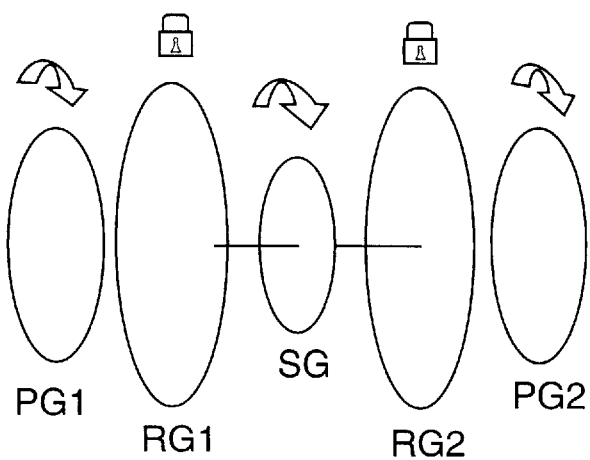

With mode (2), as illustrated in FIG. 9B, the sun gears and sun gear motor represented by SG are energized. The outer ring gears RG1 and RG2 are de-energized or locked stationary. By the rotation of SG, the planetary gears represented by PG1, PG2 rotate in the opposite direction but revolve in the same direction, whereby torque and rotational movement in the same direction as SG are outputted. In this mode, the levels of outputted rotational velocity and torque achievable are dependent on the rated performance characteristics of the sun gear motor 12c and the gear ratio of the sun gears 12a, 12b relative to the planetary gears 21a–21c, 21d–21f.

With either mode (1) or (2), the velocities may reach as high as the rated capabilities of the sun gear motor or the outer ring gear motors, depending on which motor(s) are energized. Total outputted torque will also be dependent on the rated torque capability of whichever motor(s) are energized. However, in order to achieve a given outputted actual velocity at the output shafts 30a, 30b, the outer ring gear motors 20c, 20 would be operating at a higher actual velocity than the sun gear motor 12c.

Figure 9C:
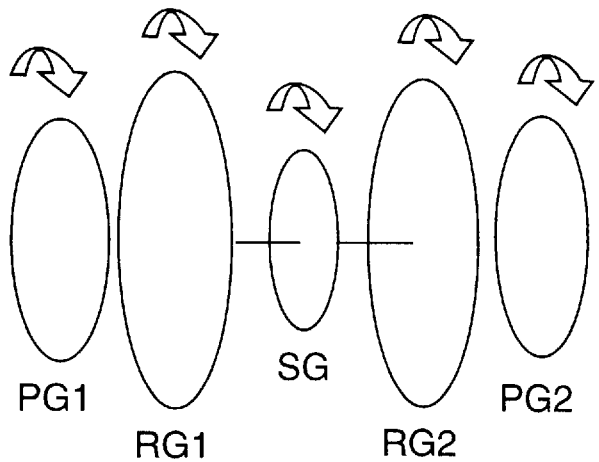

Mode (3) as shown in FIG. 9C involves the sun gears and sun gear motor represented by SG, along with the outer ring gears RG1 and RG2 all being energized and all rotating in the same direction. By the combined rotation of SG, RG1 and RG2, the planetary gears represented by PG1, PG2 remain stationary relative to and within SG, RG1 and RG2, but revolve in the same direction, whereby torque and rotational movement in the direction of rotation of SG, RG1 and RG2 together are outputted. In this mode, the levels of outputted rotational velocity and torque achievable are dependent on the rated performance characteristics of the sun gear motor 12c and the outer ring gear motors 20c, 20d when operating together and their corresponding gear ratios relative to the planetary gears. When in mode (3), angular and actual velocity may be limited only by the maximum capability of the outer ring gear motors 20c, 20d, since the outer ring gear motors will be operating at a higher actual velocity relative to the sun gear motor and to the movement of the planetary gears when the outer ring gear and sun gear motors are operating at equal angular velocities. In this mode, outputted torque is in the maximum range as a result of the combined capabilities of the outer ring gear and sun gear motors. When RG1 and RG2 are operated at the same angular velocity as SG, outputted torque and actual velocity are at a maximum. Outputted torque and actual velocity may be varied by increasing or decreasing the difference in angular velocities between the outer ring gears and the sun gear, such as by increasing or decreasing the angular velocity of either the outer ring gear motors or the sun gear motor.

Figure 9D:
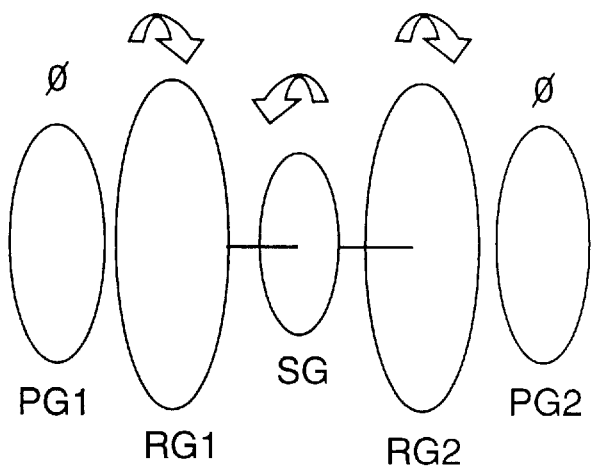

In mode (4), FIG. 9D shows that the sun gears and sun gear motor represented by SG, along with the outer ring gears RG1 and RG2 are energized, but with SG rotating in a direction opposite to RG1 and RG2. The net rotation of SG, RG1 and RG2 will result in the planetary gears individually rotating relative to SG, RG1 and RG2. However, depending upon the relative angular velocities of the outer ring gear motors and the sun gear motor, the planetary gears and the output shafts as represented by PG1 and PG2 are either stationary (equal angular velocities between the outer ring and sun gears) or exhibiting minimum (close to 0) levels of torque and rotational movement relative to a ground reference. In essence, torque and rotational movement are not outputted. Any output of torque or rotation will be a result of small differences in the angular velocities of the outer ring gear and sun gear motors. Essentially, the system is in an idle mode. As long as RG1 and RG2 are operated at the same but opposite angular velocity as SG, outputted torque and actual velocity at the output shafts 30a, 30b will remain at a minimum or 0. Outputted torque and actual velocity may be gained or varied by increasing or decreasing the angular velocity of the outer ring gear motors or the sun gear motor.

Figure 9E:
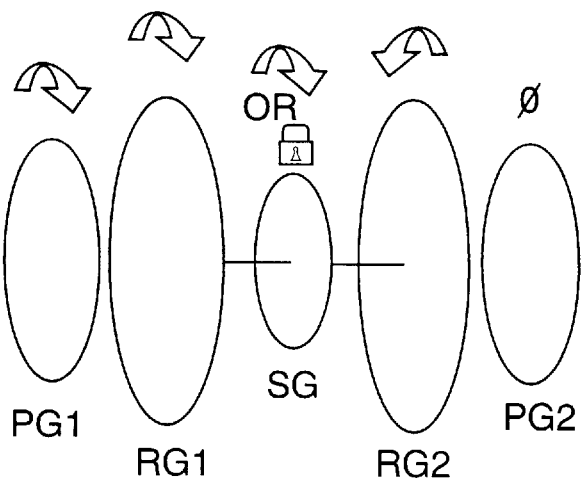

Lastly, mode (5) as shown in FIG. 9E involves SG, RG1 and RG2 being energized and rotating. However, RG1 and RG2 are being operated independent of one another whereby, for example, only RG1 is rotating in the same direction as SG. RG2 is either stationary or rotating opposite to RG1 and SG. Similar to mode (3), the combined rotation of SG and RG1 results in the planetary gear represented by PG1 remaining stationary relative to SG and RG1, but revolving in the same direction. As a result, torque and rotational movement in the direction of rotation of SG and RG1 is outputted through PG1. On the other hand, the net rotation of SG and RG2 results in the planetary gears represented by PG2 individually rotating relative to SG and RG2. Depending upon the relative angular velocities of the outer ring gear motor and the sun gear motor, the planetary gears and the output shafts as represented by PG2 are either stationary or exhibiting minimum levels of torque and rotational movement relative to a ground reference. In other words, torque and rotational movement are either not outputted all or outputted only at minimum levels. As with mode (4), PG2 is essentially in an idle mode.

In a variation of mode (5), RG1 and RG2 are energized and rotating with SG de-energized or locked stationary. RG1 and RG2 are again being operated independent of one another whereby, for example, RG1 and RG2 are rotating opposite to one another. Also, only RG1 or RG2 may be energized, while the other along with SG is de-energized or locked stationary. In this variation of mode (5), torque and rotational movement in the direction of rotation of RG1 is outputted through PG1, while those in the direction of rotation of RG2 are outputted through PG2.

Mode (5) may be used as a method for executing turns in a vehicle. For example, in the vehicle, the output shafts 30a, 30b are connected to wheels or propellers on opposite sides (i.e., left and right sides, respectively) of the vehicle but positioned to exert force in the same direction. (i.e., towards the rear). The resulting output of SG and RG1 rotating together in the same direction will, through the output shaft 30a represented by PG1 generate forward motion on the left side. The idle mode of PG2 through the opposing rotations of SG and RG2 will result in the right side of the vehicle operating as a stationary axis, whereby a right turn may be executed. If operating the variation of mode (5), the resulting output rotation of RG1 will, through the output shaft 30a represented by PG1 generate forward motion on the left side. A de-energized mode of RG2, and correspondingly PG2, will result in the right side of the vehicle operating as a stationary axis, whereby a right turn may be executed. Alternatively, an opposite rotation of RG2, and correspondingly PG2, will result in the vehicle executing a right turn relative to its central axis of rotation.

As with the prior modes, outputted torque and actual velocity (in this case, the rate of turn) may be varied by increasing or decreasing the difference in angular velocities between the outer ring gears and the sun gear, such as by increasing or decreasing the angular velocity of either the outer ring gear motors or the sun gear motor.

In a variation of mode (3), SG, RG1 and RG2 are energized and all rotating in the same direction. The combined rotation of SG with each of RG1 and RG2 results the planetary gears represented by PG1, PG2 revolving in the same direction, whereby torque and rotational movement in the direction of rotation of SG, RG1 and RG2 together are outputted. However, RG1 and RG2 are again operated independently from one another, wherein the outputted torque and actual velocity of each of PG1 and PG2 may be varied by increasing or decreasing the difference in angular velocities between a corresponding outer ring gear motor and the sun gear motor. In this variation, by varying the angular velocities of the outer ring gear motors relative to each other, turns may also be executed. For example, if the angular velocity of RG1 is set higher than that of RG2, greater torque and actual velocity will be outputted to PG1 than to PG2. A turn in favor of RG1 (e.g., a right turn) may therefore be executed.

In controlling the operation of the system described above, wheel control circuits 161, 162, sun gear control circuit 17 and central control circuit 18 (see FIG. 1) may be incorporated. The central control circuit 18 generates control signals that control the operation of each of the wheel control circuits 161, 162 and the sun gear control circuit 17. Each of the wheel control circuits 161, 162 in turn generates motor control signals that energize and operate the motor/transmission devices 141, 142, specifically the outer ring gear motors 20c, 20d. The sun gear control circuit 17 generates motor control signals that energize and operate the common sun gear device 12, specifically the sun gear motor 12c.

Figure 10:
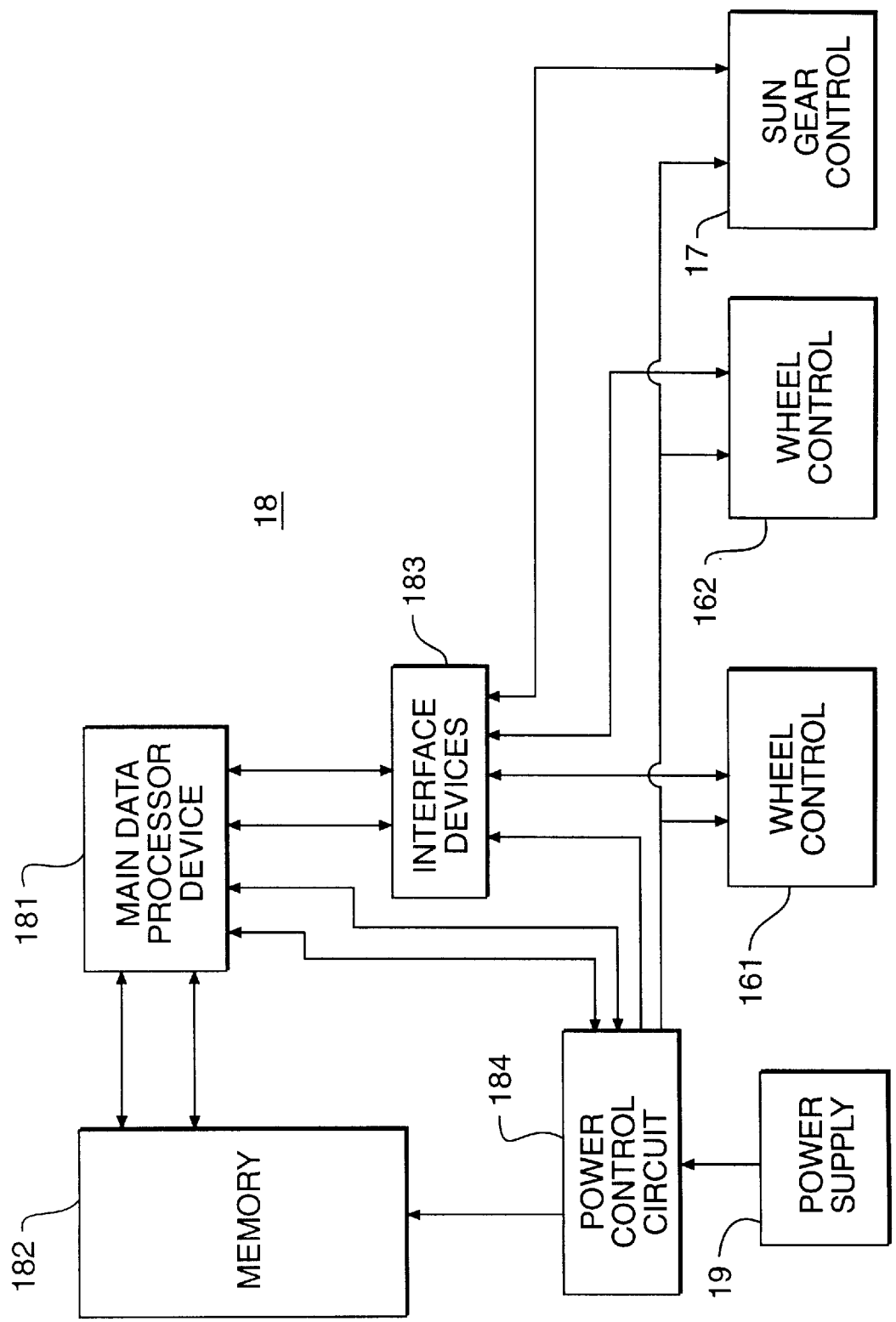
FIG. 10 illustrates a general block diagram for the implementation of the central control circuit, the wheel control circuits and the sun gear control circuit.

In the functional implementation of the control system for the present invention as shown in FIG. 10, the central control circuit 18 may consist of a main data processor device 181, a memory 182 for storing data and input/output (I/O) interface devices 183 for connecting the main data processing device 181 to the devices with which it either receives input signals or to which it transmits output signals. The central control circuit 18 also includes a power control circuit 184 for regulating and controlling the voltage and current powering the wheel control circuits 161, 162 and the sun gear control circuit 17, as well as the outer ring gear motors 20c, 20d and the sun gear motor 12c. Further, the power control circuit 184 is connected to a power supply device 19 so as to receive voltage and current therefrom.

Similarly, each of the wheel control circuits 161, 162 and the sun gear control circuit 17 may consist of (not shown) circuitry similar to that of the central control circuit 18 or other conventional circuitry for powering and/or controlling the operation of an electric motor as would be understood by one of ordinary skill in the art.

As would be understood by one of skill in the art, the main data processor device 181, the memory 182, the input/output (I/O) interface devices 183 and the power control circuit 184 may all be implemented using, for example, conventional microprocessor-, computer-, integrated circuit- or electronic-related devices rated for use in vehicle environments and applications. Similarly, the power supply device 19 may be implemented using any type of power supply as known in the art applicable for providing a portable supply of electrical energy in a vehicle. Such conventional examples include batteries and solar panels.

Referring back to FIG. 10, the central control circuit 18 is connected to receive at least control signals from the control device(s) with which a user/driver controls the direction, tuning, speed, acceleration and deceleration of the vehicle. For example, in an automotive vehicle application as illustrated, the control signals may consist of a TURN signal indicating degree and direction of movement of a steering device (i.e., a steering wheel), an ACCL signal indicating the degree of movement of an accelerator pedal, a DECL signal indicating the degree of movement of a brake pedal, and a GEAR signal indicating the specific gear setting desired by the user/driver (i.e., Park, Reverse, Neutral, Drive) through a gear shift lever. Each of these signals is inputted through the I/O interface devices 183 to the main data processing device 181. The main data processing device 181 in turn translates those signals into corresponding control signals for the wheel control circuits 161, 162 and the sun gear control circuit 17, as well as the power control circuit 184.

Correspondingly, the wheel control circuits 161, 162 and the sun gear control circuit 17 will then process the control signals from the central control circuit 18 and generate the necessary speed and direction control signals for their corresponding electric motors. Further, the power control circuit 19 may then regulate electrical energy (e.g., voltage and current levels, signal polarities, conversion between AC and DC) for powering the electric motors in the system, and then transmit that power to the wheel control circuits 161, 162 and the sun gear control circuit 17. In generating the speed and direction signals for the electric motors, the wheel control circuits 161, 162 and the sun gear control circuit 17 may further regulate and control the electrical energy inputted to them from the power control circuit 19. For example, the control circuits may also vary the voltage and/or current levels to the electric motors, convert the electrical energy between DC and AC, vary the frequency and/or amplitude of the electrical energy in AC or vary the polarity, magnitude and/or pulse widths of the electrical energy in DC. The resulting variations in the electrical energy may be used to constitute the speed and direction signals for the outer ring gears motors 20c, 20d and the sun gear motor 12c.

As an example of the operation for controlling the motors, to propel the vehicle forward, the central control circuit 18 first receives a GEAR signal indicating a "Drive" or "forward" setting and an ACCL signal indicating the desired speed and/or acceleration level. The central control circuit 18 then generates the control signals for the power control circuit 19, and for each of the wheel control circuits 161, 162 or the sun gear control circuit, as required. In other words, depending on the GEAR, ACCL, DECL signals received, the central control circuit 18, through its programming and predetermined parameters, may determine that only the outer ring gear motors 20c, 20d need to be activated (mode (1)), or that only the sun gear motor needs to be activated (mode (2)), or all the motors need to be activated (mode (3)). For example, if the vehicle is being driven within a lower range of speeds (e.g., 0–25 mph) or lower torque requirements, either the outer ring gear motors 20c, 20d or the sun gear motor 12c is activated (mode (1) or (2)). If the vehicle is being driven at higher speeds (e.g., 26+mph), the outer ring gear motors 20c, 20d and the sun gear motor 12c are activated (mode (3)). If sensors (not shown) connected to the central control circuit 18 detect excessive loads on the vehicle, the vehicle traversing an incline or any conditions requiring higher applications of torque, the outer ring gear motors 20c, 20d and the sun gear motor 12c are activated (mode (3)).

To move the vehicle in reverse, the central control circuit 18 first receives a GEAR signal indicating a "Reverse"0 setting and an ACCL signal indicating the desired speed and/or acceleration level. The central control circuit 18 generates the control signals for the power control circuit 19, and for each of the wheel control and the sun gear control circuits, as required. Again, depending on the GEAR, ACCL, DECL signals received, the central control circuit 18, through its programming and predetermined parameters, may determine that only the outer ring gear motors 20c, 20d need to be activated (mode (1)), or that only the sun gear motor needs to be activated (mode (2)), or all the motors need to be activated (mode (3)). However, the direction of rotation of the outer ring gear motors 20c, 20d and the sun gear motor 12c would be the reverse of that used in propelling the vehicle forward.

If the GEAR signal indicates a "Neutral" setting, the central control circuit 18 generates the necessary control signals for the wheel control circuits 161, 172 and the sun gear control circuit 17 to operate the motors in mode (4).

If the TURN signal indicates a desired turning direction (either left or right), then the central control circuit 18 generates the necessary control signals for the wheel control circuits 161, 172 and the sun gear control circuit 17 to operate the motors in either mode (5) or in the variation of mode (3) as discussed above.

Figure 11:
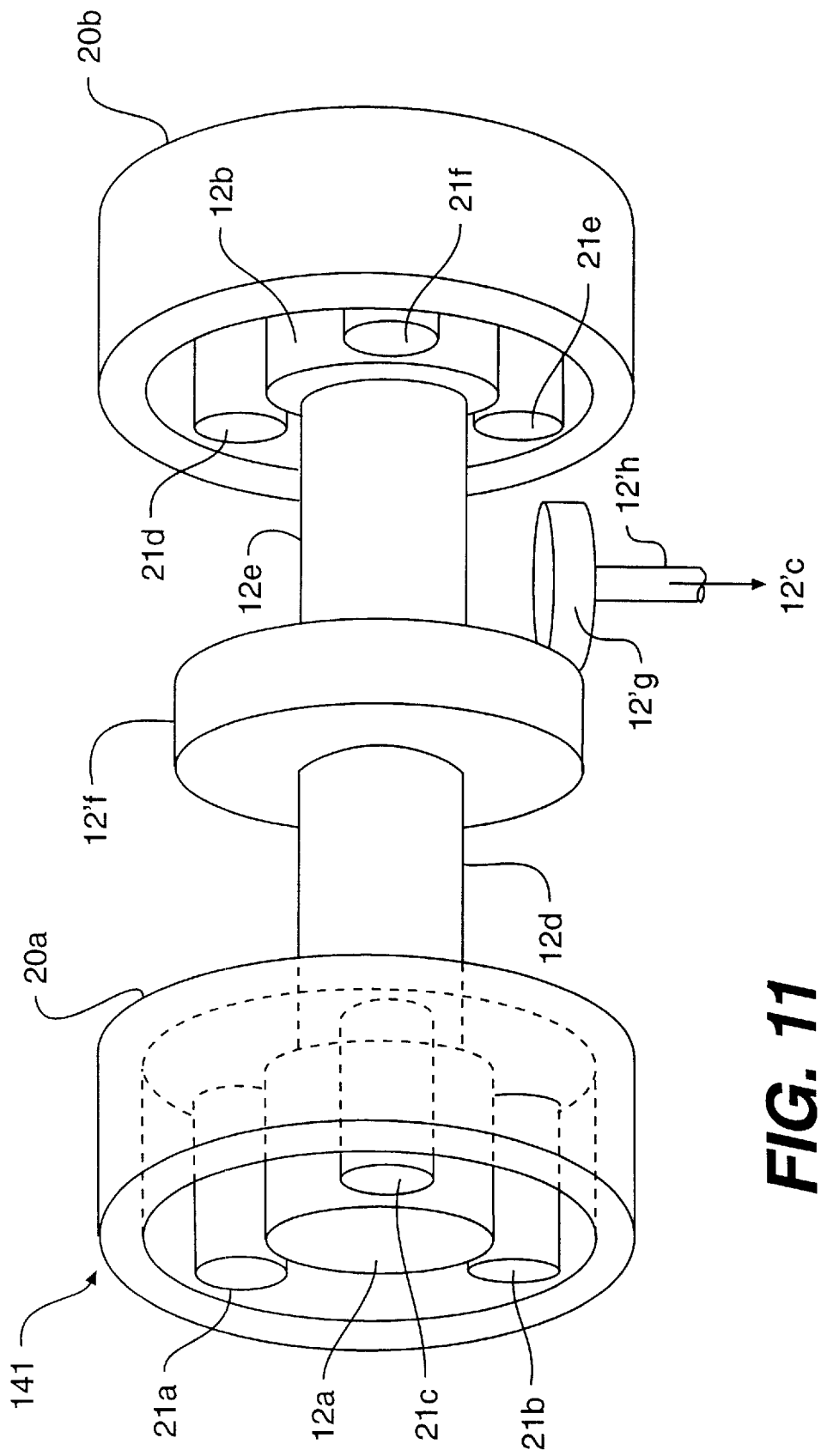
FIG. 11 illustrates a third embodiment of the present invention implementing a hybrid construction of the differential motor transmission device.

FIG. 11 illustrates a third embodiment of the present invention wherein the electric motors of either the outer ring gear motors 20c, 20d or the sun gear motor 12c may be substituted with a different powerplant structure. This would then produce a hybrid differential motor transmission system. In the example shown, the sun gear motor 12c is substituted with a fossil fuel motor 12'c. The sun gears 12a, 12b are connected via connector elements 12d, 12e to a central sun gear 12'f that is interengaged with a drive gear 12'g connected to a drive shaft 12'h of the motor 12'c. In this case, the central sun gear 12'f and drive gear 12'g are inter-engaged perpendicular to one another. However, in another embodiment, these two elements may instead be connected parallel to one another.

In an automotive vehicle application of the hybrid differential motor transmission system shown, the outer ring gear motors 20c, 20d may be energized for short range or city-type driving. The fossil fuel motor 12'c is then energized for long distance or highway driving, or for recharging the electrical power supply of the system.

Variations for the hybrid differential motor transmission system include, but are not limited to, substituting the outer ring gear motors 20c, 20d with a fossil fuel motor, substituting either the outer ring gear motors or the sun gear motor with a hydraulic motor, and forming the hybrid system based on the second embodiment of the system instead of the first embodiment (i.e., using an axial motor structure versus a radial motor structure).

Although the present invention has been fully described in connection with the preferred embodiment thereof with reference to the accompanying drawings, it is to be noted that various changes and modifications are apparent to those skilled in the art. For example, any type of control system capable of providing the necessary speed and direction signals to the motors of the present invention as known in the art may be used. These and other changes and modifications are to be understood as included within the scope of the present invention as defined by the appended claims, unless they depart therefrom.

What is claimed is:

1. A multiple input, dual output differential motor transmission device, comprising:

a sun gear device having first and second sun gears fixedly connected to each other whereby said first and second sun gears rotate together along a common axis of rotation;

first and second ring gear devices having first and second ring gears, respectively; and first and second sets of planetary gears, said first set being inter-engaged between said first sun and ring gears and said second set being inter-engaged between said second sun and ring gears, wherein said first sun and ring gears are concentrically and independently rotatable relative to each other with said first set of planetary gears inter-engaged therebetween, and said second sun and ring gears are concentrically and independently rotatable relative to each other with said second set of planetary gears inter-engaged therebetween, whereby rotation of at least one of said first ring gear, said second ring gear, and said first and second sun gear together generates at least one of rotational and revolving movement of a corresponding one of said first and second sets of planetary gears, and further wherein said sun gear device further includes a sun gear motor operatively connected said first and second sun gears, each of said ring gear devices includes first and second ring gear motors, respectively, and each of said first and second sets of planetary gears includes a mounting element on which a corresponding one of said first and second sets is rotatably mounted, whereby revolving movement of at least one of said first and second sets of planetary gears generates rotational movement in a corresponding mounting element.

2. A differential motor transmission device, according to claim 1, wherein each mounting element is operatively connected to an output element, wherein rotational movement of said mounting element generates output movement through said output element.

3. A differential motor transmission device, according to claim 1, further comprising:

control means for independently controlling each of said sun gear device, said first ring gear device and said second ring gear device.

4. A differential motor transmission device, according to claim 1, further comprising:

control means for independently controlling each of said sun gear device, said first ring gear device and said second ring gear device.

5. A differential motor transmission device, according to claim 4, wherein said control means includes first and second ring gear motor control circuits, and a sun gear motor control circuit, said first and second ring gear motor control circuits being operatively connected to said first and second ring gear devices, respectively, so as to control at least one of a speed and direction of said first and second ring gear motors, and said sun gear motor control circuit being operatively connected to said sun gear device so as to control at least one of a speed and direction of said sun gear motor.

6. A differential motor transmission device, according to claim 3, wherein said control means includes input means through which user input signals are inputted for controlling each of said sun gear device, said first ring gear device and said second ring gear device.

7. A differential motor transmission device, according to claim 6, wherein said control means further includes a central control circuit and input means through which user input signals are inputted into said central control circuit, said central control circuit including means for translating said user input signals into control signals for each of said first and second ring gear motor control circuits and said sun gear motor control circuit.

8. A multiple input, dual output differential motor transmission system, comprising:

a sun gear device having first and second sun gears, means for fixedly connecting said first and second sun gears to each other along a common axis of rotation, and sun drive means for rotatively driving said first and second sun gears together;

a first ring gear device having a first ring gear and a first ring drive means for rotatively driving said first ring gear;

a second ring gear device having a second ring gear and a second ring drive means for rotatively driving said second ring gear;

a first plurality of planetary pinion gears, including a first mounting element on which each of said first plurality of pinion gears is rotatably mounted;

a second plurality of planetary pinion gears, including a second mounting element on which each of said second plurality of pinion gears is rotatably mounted, wherein each of said first plurality of pinion gears is inter-engaged between said first sun gear and said first ring gear, said first sun and ring gears being concentrically and independently rotatable relative to each other, and each of said second plurality of pinion gears is inter-engaged between said second sun gear and said second ring gear, said second sun and ring gears being concentrically and independently rotatable relative to each other; and control means for controlling each of said sun drive means, said first ring drive means and said second ring drive means independent of each other, whereby operation of at least one of said sun drive means, said first ring drive means and said second ring drive means at least one of revolvingly drives said first and second pluralities of planetary pinion gears and rotationally drives each of pinion gear in said first and second pluralities of pinion gears.

9. A differential motor transmission system, according to claim 8, wherein said sun drive means includes a sun gear motor, said first ring drive means includes a first ring gear motor, and said second ring drive means includes a second ring gear motor.

10. A differential motor transmission system, according to claim 8, wherein said first mounting element includes a first output means for outputting at least revolving movement of said first plurality of planetary pinion gears and said second mounting element includes a second output means for outputting at least revolving movement of said second plurality of planetary pinion gears.

11. A differential motor transmission system, according to claim 10, wherein said first output means includes a first output element for generating rotational output movement translated from said revolving movement of said first plurality of planetary pinion gears, and said second output means includes a second output element for generating rotational output movement translated from said revolving movement of said second plurality of planetary pinion gears.

12. A differential motor transmission system, according to claim 8, wherein said control means includes first and second ring drive control circuits, and a sun drive control circuit, said first and second ring drive control circuits being operatively connected to said first and second ring drive means, respectively, so as to control at least one of a speed and direction of said first and second ring gears, and said sun drive control circuit being operatively connected to said sun drive means so as to control at least one of a speed and direction of said first and second sun gears.

13. A differential motor transmission system, according to claim 8, wherein said control means includes input means through which user input signals are inputted for controlling each of said sun gear device, said first ring gear device and said second ring gear device.

14. A differential motor transmission system, according to claim 8, wherein said control means further includes a central control circuit and input means through which user input signals are inputted into said central control circuit, said central control circuit including means for translating said user input signals into control signals for each of said first and second ring drive control circuits and said sun drive control circuit.

* * * * *